June 12, 1951 — R. C. JOHNSTON ET AL — 2,556,372
EXPANSIBLE DEVICE FOR TAPPING OR REAMING HOLES
Filed Nov. 6, 1946
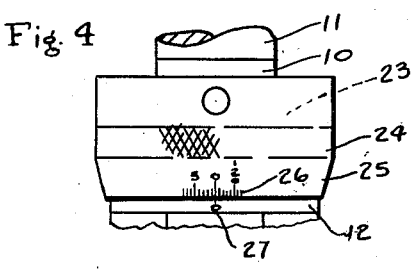
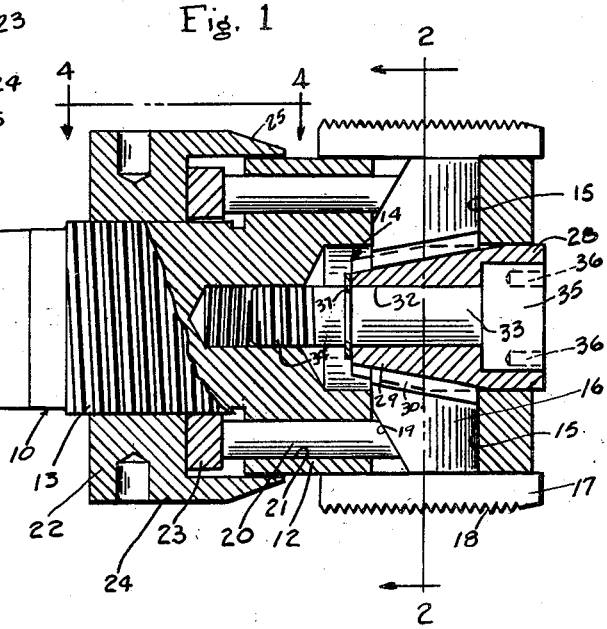
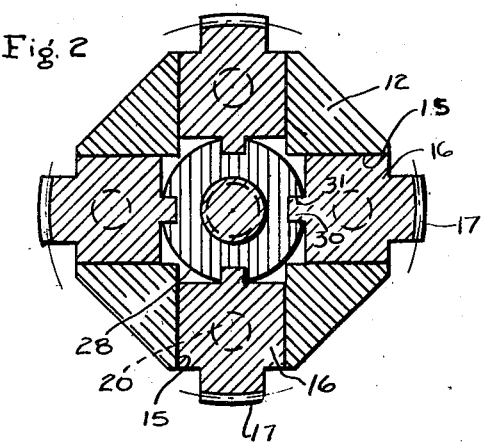
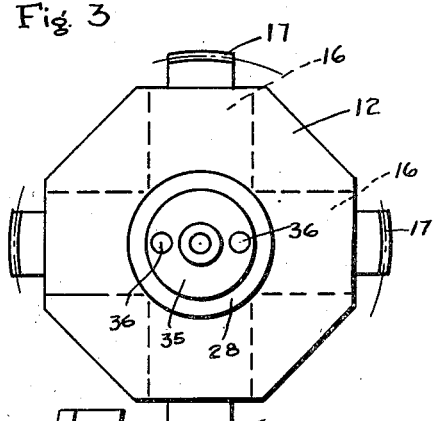
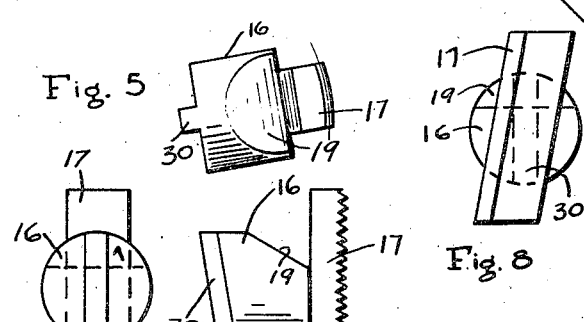
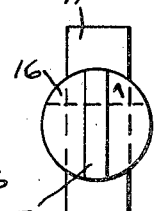
INVENTORS
Robert C. Johnston,
Charles E. Cutshall Jr.
BY Lawrence Reed
Atty.

Patented June 12, 1951

2,556,372

UNITED STATES PATENT OFFICE 2,556,372

EXPANSIBLE DEVICE FOR TAPPING OR REAMING HOLES

Robert C. Johnston and Charles E. Cutshall, Jr., Springfield, Ohio

Application November 6, 1946, Serial No. 708,146

7 Claims. (Cl. 10—142)

This invention relates to an expansible device for tapping or reaming holes in structures of metal or other material.

One object of the invention is to provide such a device in which the cutting elements can be quickly and accurately adjusted to the desired overall diameter.

A further object of the invention is to provide such a device with a controlling member which can be adjusted to a selected position to predetermine the overall diameter of the cutting elements, and said cutting elements then secured in positions determined by the controlling member.

A further object of the invention is to provide such a device with which the cutting elements are accurately located and positively locked in their predetermined positions.

A further object of the invention is to provide such a device which can be used for any one of a plurality of cutting operations by merely removing one set of cutting elements and substituting therefore another set of cutting elements.

A further object of the invention is to provide such a device of a simple relatively inexpensive construction and of a strong durable character.

Other objects of the invention may appear as the device is described in detail.

In the accompanying drawings Fig. 1 is a longitudinal section, partly in elevation and partly broken away, of a device embodying the invention; Fig. 2 is a transverse section taken on the line 2—2 of Fig. 1; Fig. 3 is a front end elevation of the device; Fig. 4 is a detail view of the controlling member showing the graduations thereon; Figs. 5, 6, and 7 are detail views of one of the cutting elements; and Fig. 8 is a detail view of another form of cutting element.

In these drawings we have illustrated the preferred embodiment of our invention and have shown the same as designed primarily as a tapping device, but it is to be understood that the device as a whole, as well as the several parts thereof, may take various forms, and that the device may be used for various cutting operations, without departing from the spirit of the invention.

In the particular embodiment here illustrated the device comprises a body 10 including a part, such as a shank 11, whereby it may be supported for rotation about a longitudinal axis. The forward portion of the body is enlarged to provide a head 12, and between the head 12 and the shank 11 the body is provided with a screw threaded portion 13. The head 12 is provided in its forward portion with an axial bore 14 and also with radial guideways, here shown as cylindrical bores 15, which open into the axial bore 14.

Mounted in each of the guideways 15 is a cutting element which comprises an inner portion or shank 16 slidably mounted in the corresponding guideway 15, and an outer portion or cutter 17. In the main views of the drawing each cutting element has a series of transverse teeth 18 and constitutes a tapping element for forming screw threads, but the cutting edges may be of any suitable character and in Fig. 8 we have shown such a cutting element provided with a reamer blade. The inner portion or shank 16 is of a shape to fit snugly but slideably in the corresponding guideway, and in the present arrangement is of generally cylindrical form, but a portion of the rear side thereof is cut away to form a surface 19 which is inclined outwardly and forwardly with relation to the head.

Mounted in the head 12 are a plurality of positioning members which are longitudinally adjustable to limit the outward movements of the respective cutting elements. In the arrangement shown these positioning members are in the nature of rods 20 slideably mounted in longitudinal bores 21 formed in the head and spaced from the axis thereof, each bore being preferably in line with one of the guideways 15. The positioning members may take any suitable form but they are here shown as cylindrical rods of such length that the ends thereof project beyond the ends of the bores 21, thus the forward end of each positioning rod extends into the corresponding guideway to engage the inclined surface on the cutting element therein and limit the outward movement of the cutting element. Preferably the positioning rod is provided with an inclined end surface parallel with the inclined surface of the cutting element.

Mounted on the body 10 is an adjustable device whereby the positions of the positioning members may be accurately determined. This adjustable device, or controlling member, is here shown as an annular member 22 mounted on and having threaded connection with the screw threaded portion 13 of the body, so that the rotation of the annular member will impart axial movement thereto. The threads are preferably very fine so that the axial movement is small with relation to the rotary movement and thus facilitates the making of very fine adjustments. This annular member is arranged in line with the positioning members and positively limits the rearward movement of those members. The controlling member 22 is provided with a peripheral flange 24 which projects forwardly about the rear portion of the head 12. The forward portion of this flange is bevelled as shown at 25 and has formed thereon a series of fine graduations 26 which cooperate with an indicating mark 27 on the head 12 to indicate the radial positions which will be occupied by the cutting elements when they are in contact with the positioning members and the positioning members are at the rearward limits of their movements, and will thus indicate the overall diameter of the cutting elements. In effecting the adjustment the controlling member is moved to the desired position as indicated by the graduations and the cutting elements are then moved outwardly until they are tightly wedged between the inclined edges of the positioning members and the front walls of the guideways 15. The positioning members 20 being of exactly the same length, and the inclined surfaces on the cutting elements being identical, it follows that when the cutting elements have been moved to the outer limits of their movements the cutting edges thereof will be spaced from the axis of the head exactly the same distances. The positioning members may have direct contact with the face of the controlling member but to avoid the possibility of the controlling member being slightly indented by the positioning member and the accuracy of the indications thereon destroyed it is preferable to interpose a ring or collar 23 of hard metal between the positioning members and the face of the controlling member.

Outward movement may be imparted to the cutting elements in any suitable manner. In the present construction an expanding device 28 is mounted in the axial bore 14 in the head. The forward portion of this device is preferably cylindrical so it may have a snug running fit in the bore 14, and the inner portion 29 thereof is tapered rearwardly and is preferably frusto-conical in form. The tapered surface of the expanding device is adapted to engage the inner ends of the cutting elements and to move the same outwardly when the expanding device is moved rearwardly. In the present arrangement the inner end of each cutting element is inclined rearwardly toward the axis of the head at an angle which corresponds substantially to the taper of the inner portion of the expanding device, and it is also desirable that this inclined surface of the cutting element shall have a portion 30 of reduced width, constituting a rib which extends into and is slidable in a longitudinal groove 31 in the tapered surface of the expanding device. The expanding device may be moved inwardly and secured in its expanding position in any suitable manner. As here shown the expanding member has a longitudinal bore 32 through which extends a screw 33, the inner end portion 34 of which is screw threaded into the head 12. That portion of the screw within the bore 32 is smooth and freely rotatable and the screw has at its outer end a head 35 which engages the expanding member and moves the same rearwardly when the screw is screwed into the head. In the present instance the head 35 of the screw is seated in a recess in the outer end of the expanding member and the head is provided with sockets 36 to receive a spanner wrench by which the screw may be rotated. In order that the expanding member may be retracted by the outward movement of the screw, the latter is provided with a circumferential groove to receive a snap ring 37 which engages the inner end of the expanding member and presses the latter outwardly when the screw is moved outwardly.

It will be obvious that when the controlling member 22 has been adjusted to determine the over all diameter of the cutting elements, the rearward movement of the expanding member will cause the cutting elements to be moved outwardly into engagement with the respective positioning members and if the positioning members are not already in contact with the adjusted controlling member the continued movement of the cutting elements will move them into contact therewith and the outward movement of the cutting elements will be obviously interrupted in the positions determined by the controlling member. Thus the several cutting elements are simultaneously moved to operative positions determined by the adjustment of the controlling member and are locked against inward movement by the expanding member. Only two operations are necessary. First, the adjustment of the controlling member and second the actuating of the expanding member.

While we have shown and described one embodiment of our invention, we wish it to be understood that we do not desire to be limited to the details thereof as various modifications may occur to a person skilled in the art.

Having now fully described our invention, what we claim as new and desire to secure by Letters Patent is:

1. In an expansible cutting device, a body having means whereby it may be rotatably supported and having in the forward portion thereof a plurality of substantially radial guideways, cutting elements slidable in the respective guideways and each having a rear surface inclined outwardly and forwardly with relation to said body and a relatively narrow inner portion inclined rearwardly toward the axis of said body, a plurality of positioning members separately mounted in said body in the rear of said cutting elements for fore and aft movement and having parts to engage the inclined rear surfaces of the respective cutting elements, a member mounted on said body for adjustment lengthwise thereof to selected positions and having a part in the rear of said positioning members to limit the rearward movement of the latter, an element supported between the inner ends of said cutting elements and having rearwardly converging longitudinal grooves to receive the inclined inner portions of said cutting elements, and means for moving said grooved element rearwardly with relation to said cutting elements to cause the rearwardly inclined surfaces of said cutting elements to engage said positioning members and press the latter against said adjustable member and thereby lock said cutting elements in radial positions determined by the adjusted position of said adjustable member.

2. In an expansible cutting device, a body having means whereby it may be rotatably supported and having in the forward portion thereof a plurality of substantially radial guideways, cutting elements slidable in the respective guideways and each having a rear surface inclined outwardly and forwardly with relation to said body and an inner surface inclined rearwardly toward the axis of said body, a plurality of positioning members separately mounted in said body for fore and aft movement and having parts to engage the rear inclined surfaces of the respective cutting elements, a member mounted on said body for adjustment lengthwise thereof to selected positions and having a part in the rear of said positioning members to limit the rearward movement of the latter, a rearwardly tapered element supported between and engaging the inclined inner surfaces of said cutting elements, said tapered element having a longitudinal bore, and a screw extending through said bore and threaded into said body to move said tapered element rearwardly and move said inclined rear surfaces of said cutting elements into firm engagement with said positioning members and to thereby press said positioning members against said adjustable member and lock said cutting elements in positions determined by the adjusted position of said adjustable member 3. In an expansible cutting device, a body having means whereby it may be rotatably supported and having in the forward portion thereof a plurality of substantially radial guideways, cutting elements slidable in the respective guideways and each having a surface inclined to the axis of said body, said body also having longitudinal guideways spaced from the axis thereof, reciprocatory elements slidably mounted in the respective last mentioned guideways and projecting beyond both ends thereof, the forward portions of said reciprocatory elements extending into the respective radial guideways and having inclined end surfaces to engage the inclined surfaces of said cutting elements, adjustable means to limit the rearward movement of said reciprocatory elements, and means carried by said body for moving said cutting elements outwardly into contact with said reciprocatory elements and for locking the same in the positions to which they have been moved.

4. In an expansible cutting device, a body having means whereby it may be supported for rotation about a longitudinal axis and having in the forward portion thereof an axial bore, said body also having a plurality of substantially radial guideways communicating with said bore, cutting elements slidably mounted in the respective guideways and each having a rear inclined surface and an inclined inner end surface, positioning members mounted on said body for longitudinal movement and having the forward ends thereof arranged to engage the rear inclined surfaces of the respective cutting elements, a member adjustably mounted on said body in line with said positioning members to limit the rearward movement of the latter, an axially movable member in said bore having a rearwardly tapered surface to engage the inclined inner ends of said cutting elements and move the same outwardly and having a longitudinal opening, and a screw extending through said opening, having an inner portion screw threaded into said body and having a head to engage the outer end of said axially movable member.

5. In an expansible cutting device, a body having at adjacent one end thereof means whereby it may be supported for rotation about a longitudinal axis and having adjacent the other end thereof a head provided with an axial bore, said head also having a plurality of substantially radial guideways communicating with said bore, cutting elements slidably mounted in the respective guideways and each having a rear surface inclined to the axis of said bore, positioning members mounted in said head for longitudinal movement and having the forward ends thereof arranged to engage the inclined surfaces of the respective cutting elements, an annular member mounted on and having screw threaded connection with said body in the rear of and spaced from said head to limit the rearward movement of said positioning members, said annular member having a flange extending forwardly about said head and provided with a series of graduations, and said head having an indicating mark to cooperate with said graduations, and an operable device in the bore of said body to move said cutting elements outwardly into firm contact with said positioning members and to positively retain the same in the positions to which they have been moved.

6. In an expansible cutting device, a body having at adjacent one end thereof means whereby it may be supported for rotation about a longitudinal axis and having adjacent the other end thereof a head provided with an axial bore, said head also having a plurality of substantially radial guideways communicating with said bore, cutting elements slidably mounted in the respective guideways and each having a rear surface inclined to the axis of said bore, positioning members mounted in said head for longitudinal movement and having the forward ends thereof arranged to engage the inclined surfaces of the respective cutting elements, an annular member mounted on and having screw threaded connection with said body in the rear of and spaced from said head to limit the rearward movement of said positioning members, said annular member having a flange extending forwardly about said head and provided with a series of graduations, and said head having an indicating mark to cooperate with said graduations, a collar interposed between said annular member and said head and connected with said positioning members, and an operable device in the bore of said body to move said cutting elements outwardly into firm contact with said positioning members and to positively retain the same in the positions to which they have been moved.

7. In an expansible cutting device, a body having means whereby it may be supported for rotation about a longitudinal axis and having a head provided in the forward portion thereof with an axial bore, said head also having a plurality of substantially radial guideways communicating with said bore, cutting elements slidably mounted in the respective guideways and each having a rear surface inclined to the axis of said bore and an inclined inner end surface, positioning members mounted in said head for longitudinal movement and having the forward ends thereof arranged to engage the rear inclined surfaces of the respective cutting elements, an annular member mounted on and having screw threaded connection with said body in the rear of said head to limit the rearward movement of said positioning members, said annular member having a flange extending forwardly about said head and provided with a series of graduations, said head having an indicating mark to cooperate with said graduations, an axially movable member in said bore having a rearwardly tapered surface to engage the inclined inner ends of said cutting elements and move the same outwardly and having a longitudinal opening, a screw extending through said opening, having an inner portion screw threaded into said head and having an enlarged portion to engage the outer end of said axially movable member.

ROBERT C. JOHNSTON.
CHARLES E. CUTSHALL, Jr.

(References on following page)

REFERENCES CITED

The following references are of record in the file of this patent:

UNITED STATES PATENTS

| Number | Name | Date |
|---|---|---|
| 757,494 | Pohlman | Apr. 19, 1904 |
| 914,328 | Barnes | Mar. 2, 1909 |
| 1,062,225 | Crowley | May 20, 1913 |
| 1,114,039 | Richards | Oct. 20, 1914 |
| 1,307,103 | Wildey | June 17, 1919 |
| 1,516,172 | Berg | Nov. 18, 1924 |
| 1,963,767 | Vanderlip | June 19, 1934 |

FOREIGN PATENTS

| Number | Country | Date |
|---|---|---|
| 113,319 | Great Britain | Feb. 18, 1918 |